(12) United States Patent
Karaoguz et al.

(10) Patent No.: US 7,593,530 B2
(45) Date of Patent: Sep. 22, 2009

(54) SECURE LEGACY MEDIA PERIPHERAL ASSOCIATION WITH AUTHENTICATION IN A MEDIA EXCHANGE NETWORK

(75) Inventors: Jeyhan Karaoguz, Irvine, CA (US); James Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 664 days.

(21) Appl. No.: 10/675,386

(22) Filed: Sep. 30, 2003

(65) Prior Publication Data

US 2004/0117635 A1 Jun. 17, 2004

Related U.S. Application Data

(60) Provisional application No. 60/461,717, filed on Apr. 10, 2003, provisional application No. 60/457,179, filed on Mar. 25, 2003, provisional application No. 60/443,894, filed on Jan. 30, 2003, provisional application No. 60/432,472, filed on Dec. 11, 2002.

(51) Int. Cl.
*H04K 1/00* (2006.01)
(52) U.S. Cl. ............... 380/258; 380/278; 713/155; 713/182; 726/2; 726/3
(58) Field of Classification Search ............... 713/182, 713/168, 171, 155; 726/2–3; 707/9–10; 370/313; 380/258, 278
See application file for complete search history.

(56) References Cited

U.S. PATENT DOCUMENTS

| 6,058,106 | A  | * | 5/2000  | Cudak et al. ............. 370/313 |
| 6,839,848 | B1 | * | 1/2005  | Kirikoshi et al. ............ 726/2 |
| 2003/0072027 | A1 | * | 4/2003  | Haines et al. ............ 358/1.15 |
| 2003/0074268 | A1 | * | 4/2003  | Haines et al. ............. 705/26 |
| 2003/0212889 | A1 | * | 11/2003 | Khieu et al. .............. 713/164 |

* cited by examiner

*Primary Examiner*—Thanhnga B Truong
(74) *Attorney, Agent, or Firm*—McAndrews, Held & Malloy, Ltd.

(57) ABSTRACT

Aspects for secure access and communication of information in a distributed media network may include detecting when a legacy media peripheral is connected to a PC and/or a media processing system on the distributed media network. One or more identifiers associated with the legacy media peripheral may be established and utilized to facilitate communication of the legacy media peripheral over the distributed media network. At least one legacy media peripheral identifier and at least one identifier of a user utilizing the legacy media peripheral may be requested. The legacy media peripheral identifier may be a serial number of the legacy media peripheral, while the user identifier may be a user password and/or a user name. Media peripheral association software may be executed on the PC and/or the media processing system and utilized for media peripheral association and authentication in accordance with various embodiments of the invention.

25 Claims, 12 Drawing Sheets

| CHANNELS | << 1PM | 2PM | ... | 6PM | 7PM >> |
|---|---|---|---|---|---|
| Family Vacations | | | | | |
| Kids sports | | | | | |
| ... | | | | | |
| Vacation in Alaska Video  802 | Normal Estimated Delivery Time: 2 Hrs 13 mins Cost: $0.59 (Without Queuing) | | Showing All day (48 mins) Earliest Order Time: 4:00 PM MPEG-2, 1.5 Mbps | | |
| Vacation in Alaska Video  803 | Express Estimated Delivery Time: 18 mins Cost: $1.20 (With Queuing) | | Showing All day (48 mins) Earliest Order Time: 4:00 PM MPEG-2, 4 Mbps | | |
| Vacation in Alaska Video  804 | Overnight Delivery: available Next Morning Cost: $0.05 (Server Stored) | | Showing All day (48 mins) Earliest Order Time: 4:00 PM MPEG-2, 19 Mbps | | |

Fig. 8

SECURE LEGACY MEDIA PERIPHERAL ASSOCIATION WITH AUTHENTICATION IN A MEDIA EXCHANGE NETWORK

CROSS-REFERENCE TO RELATED APPLICATIONS/INCORPORATION BY REFERENCE

This application makes reference to, claims priority to, and claims the benefit of:

U.S. Provisional Application Ser. No. 60/432,472 filed Dec. 11, 2002;

U.S. Provisional Application Ser. No. 60/443,894 filed Jan. 30, 2003;

U.S. Provisional Application Ser. No. 60/457,179 filed Mar. 25, 2003; and

U.S. Provisional Application Ser. No. 60/461,717 filed Apr. 10, 2003.

This application also makes reference to:

U.S. application Ser. No. 10/657,390 filed Sep. 8, 2003; and

U.S. application Ser. No. 10/660,267 filed Sep. 11, 2003.

All of the above stated applications are incorporated herein by reference in their entirety.

FIELD OF THE INVENTION

Certain embodiments of the invention relate to secure information transfer in a distributed media network. More specifically, certain embodiments of the invention relate to secure peripheral association with authentication in a media exchange network.

BACKGROUND OF THE INVENTION

Today, digital media devices such as digital camcorders, digital cameras, and MP3 players are standalone devices that may be connected to a computing device such as personal computer (PC) through, for example, a universal serial bus (USB), Firewire (IEEE 1394) or other suitable interface. These interfaces are general high speed interfaces that may permit download of digital files without any form of user authentication or authorization.

In instances where a digital media device may roam or relocate from a first location having a PC to a second location lacking a PC, utilization of the digital device by a user may be limited to basic operations, for example. For example, the user may be limited by the memory capacity of the digital media device and any additional memory that may be utilized the digital media device. The additional memory may include plug-in memory cards such as CompactFlash™, SmartMedia™, Memory Stick™, Secure Digital™, MultiMedia, PCMCIA, tape, CD-R, CD-RW, DVD-R and/or DVD-RW. The user of the device has to travel with appropriate memory device(s) to ensure that they are available when needed.

Digital files within a digital media device may be downloaded to a PC, encrypted by the PC, attached to an email message, and sent to another PC via the Internet. Also, the digital files may be sent over a network using, for example, file transfer protocol (FTP), and hypertext transfer protocol (HTP) their variants and other similar transfer protocols. However, neither the Internet nor the network has any knowledge of the original source of the digital files such as the digital media device. This raises security concerns including data integrity, media integrity and device integrity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for secure access and communication of information in a distributed media network through secure media peripheral association with authentication. The method for secure access and communication of information in a distributed media network may include the step of detecting when a legacy media peripheral is connected to a PC and/or a media processing system on the distributed media network. One or more identifiers associated with the legacy media peripheral may be established and utilized to facilitate communication of the legacy media peripheral over the distributed media network. At least one legacy media peripheral identifier and at least one identifier of a user utilizing the legacy media peripheral may be requested. The legacy media peripheral identifier may be a serial number of the legacy media peripheral, while the user identifier may be a user password and/or a user name. Media peripheral association software may be executed on the PC and/or the media processing system.

The method may also include determining a first location of the legacy media peripheral and the user utilizing the legacy media peripheral. An association may be created between the legacy media peripheral identifier and/or the user identifier, and the location of the legacy media peripheral. If the legacy media peripheral previously registered at a first location within the network, at least one user identifier may be acquired to facilitate communication between the legacy media peripheral and entities on the distributed media network. The acquired user identifier for the legacy media peripheral may be authenticated prior to facilitating communication between the legacy media peripheral and the distributed media network. The legacy media peripheral may also be registered in order to ensure operation of the legacy media peripheral at a second location subsequent to validation of the acquired user identifier.

Another embodiment of the invention may provide a machine-readable storage, having stored thereon, a computer program having at least one code section for providing secure access and communication of information in a distributed media network according to the steps as described above.

Another aspect of the invention may provide a system for secure access and communication of information in a distributed media network. The system may include at least one processor that may detect when a legacy media peripheral is connected to the PC and/or a media processing system coupled to the distributed media network. The processor may establish and associate one or more identifiers with the legacy media peripheral, which may be utilized to facilitate communication of the legacy media peripheral over the distributed media network. Specifically, the processor may be configured to request a legacy media peripheral identifier and an identifier of a user that utilizes the legacy media peripheral. The legacy media peripheral identifier may be a serial number of the legacy media peripheral, while the user identifier may be a user password and/or a user name. The processor may be configured to execute media peripheral association software on the PC and/or the media processing system.

The processor may also determine a first location of the legacy media peripheral and the user utilizing the legacy media peripheral. The processor may then create an association between the legacy media peripheral identifier and/or the user identifier, and the location of the legacy media peripheral. If the legacy media peripheral previously registered at a first location within the network, the processor may acquire the user identifier previously utilized to facilitate communication between the legacy media peripheral and entities on the distributed media network. The acquired user identifier for the legacy media peripheral may be authenticated by the processor prior to facilitating communication of the legacy media peripheral over the distributed media network. The processor may also be utilized to register the legacy media peripheral for operation at a second location subsequent to validation of the acquired user identifier. The processor may be a computer processor, a media peripheral processor, a media exchange system processor and/or a media processing system processor.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a media guide user interface showing several options of a pushed media in accordance with an embodiment of the present invention.

DETAILED DESCRIPTION OF THE INVENTION

Certain embodiments of the invention provide a method and system for secure media peripheral association with authentication in a distributed media network. The invention may also provide secure access and communication of information in the distributed media network. Media peripheral association software may be executed on a PC and/or a media processing system and utilized for media peripheral association and authentication. The invention may include the step of detecting when a legacy media peripheral is connected to the PC and/or the media processing system on the distributed media network. One or more identifiers associated with the legacy media peripheral may be established and utilized to facilitate communication of the legacy media peripheral over the distributed media network. Specifically, at least one legacy media peripheral identifier and at least one identifier of a user utilizing the legacy media peripheral may be requested. The legacy media peripheral identifier may be a serial number of the legacy media peripheral, while the user identifier may be a user password and/or a user name.

In another aspect of the invention, a first location of the legacy media peripheral and the user that utilizes the legacy media peripheral may be determined. A telephone or directory number (DN), for example, may be utilized as a location identifier. An association may be created between the legacy media peripheral identifier and/or the user identifier, and the location of the legacy media peripheral. In instances where the legacy media peripheral previously registered at a first network location, at least one user identifier may be acquired to facilitate communication between the legacy media peripheral and entities on the distributed media network. The acquired user identifier for the legacy media peripheral may be authenticated prior to facilitating communication of the legacy media peripheral over the distributed media network. The legacy media peripheral may also be registered in order to ensure operation of the legacy media peripheral at a second location subsequent to validation of the acquired user identifier.

Figure 1:
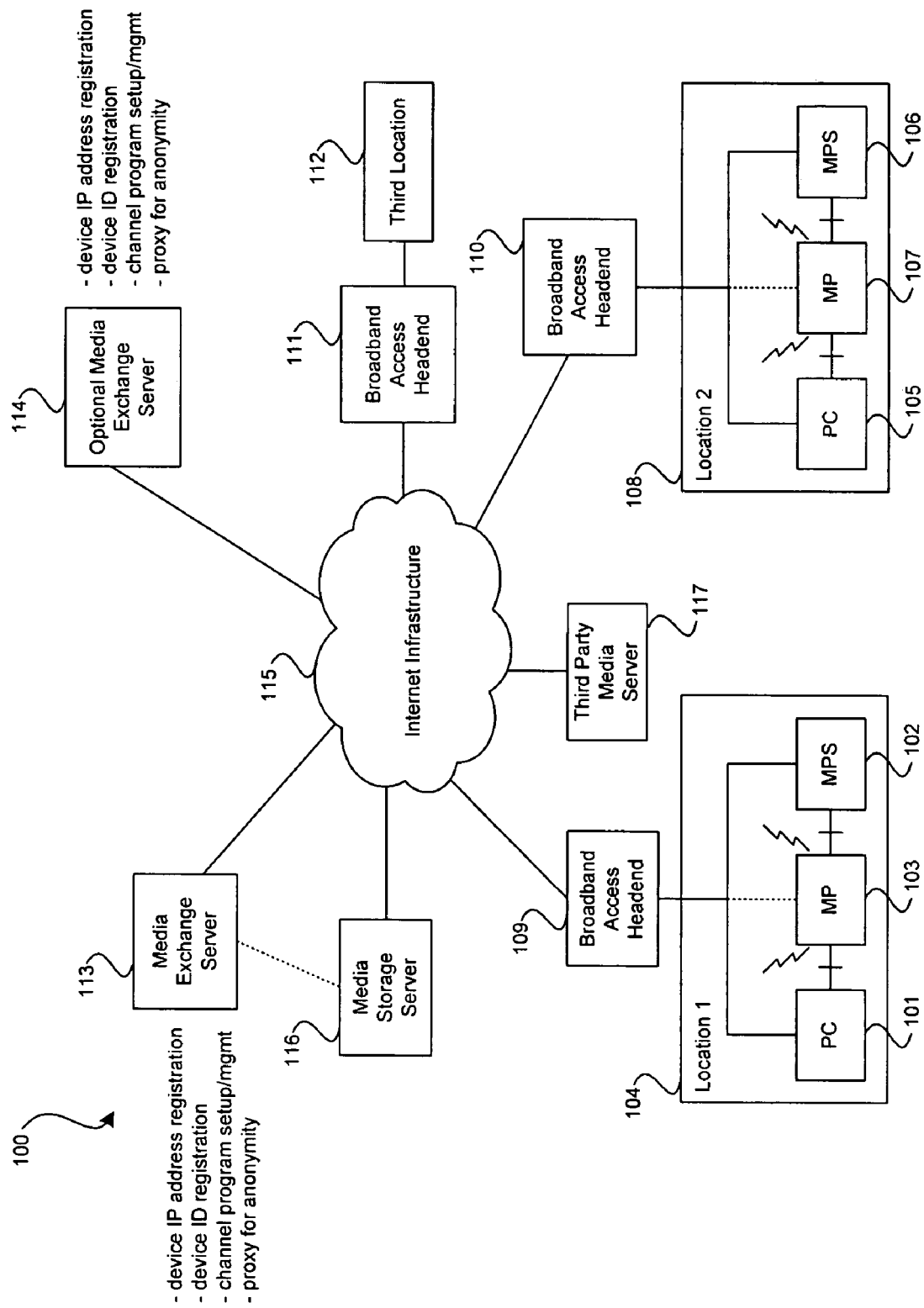
FIG. 1 is a diagram illustrating an embodiment of a media exchange network comprising an architecture to support secure media peripheral association and authentication, in accordance with various aspects of the invention.

FIG. 1 is a diagram illustrating an embodiment of a media exchange network 100 comprising an architecture to support secure media peripheral association and authentication, in accordance with various aspects of the invention. Specifically, the media exchange network 100 may be a communication network comprising a personal computer (PC) 101, a media processing system (MPS) 102, and at least one media peripheral (MP) 103 at a first location 104. The first location may be a first home, for example. Additionally, a PC 105, an MPS 106, and at least one MP 107 may be located at a second location 108. The second location 108 may be a home. The MP 103 may interface with the PC 101 and/or the MPS 102 via, for example, a wireless link and/or a wired link. The wired link may be a USB or a Firewire (IEEE 1394) connection. A personal computer (PC) comprising media exchange software (MES) running on or being executed by the personal computer, may also be referred to as a media processing system.

The PC 101 and the MPS 102 may interface with a broadband access headend 109. The broadband access headend 109 may comprise a cable headend, a satellite headend, and/or a DSL headend, in accordance with various embodiments of the invention. Optionally, the MP 103 may interface with the broadband access headend 109. The PC 101, MPS 102, and/or MP 103 may include internal modems such as a cable modem or DSL modem, or other interface devices in order to communicate with the broadband access headend 109.

Optionally, the interface device such as a modem may be external to the PC 101, MPS 102, and MP 103.

Similarly, the MP 107 may interface with the PC 105 and/or the MPS 106 via, for example, a wireless link and/or a wired link such as a USB or Firewire (IEEE 1394) connection. The PC 105 and the MPS 106 may interface with a broadband access headend 110. The broadband access headend 110 may include a cable headend, a satellite headend, or a DSL headend, in accordance with various embodiments of the present invention. Optionally, the MP 107 may interface with the broadband access headend 110. The PC 105, MPS 106, and/or MP 107 may include internal modems such as a cable modem or DSL modem, or other interface device in order to communicate with the broadband access headend 110. Optionally, the interface device such as a modem may be external to the PC 105, MPS 106, and MP 107.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The media exchange network 100 may further include a broadband access headend 111 that may be connected between a third location 112, an Internet infrastructure 115 and a media exchange server 113. In one aspect of the invention, a single central server may support the media exchange network 100. However, the invention is not so limited, and at least one other media exchange server 114 may optionally support the media exchange network 100 that is coupled to Internet infrastructure 115. This optional arrangement may be referred to as a multiserver arrangement. Accordingly, an embodiment of the present invention may include two or more media exchange servers strategically located at various locations in the media exchange network 100.

The broadband access headends 109 and 110 may also interface to the Internet infrastructure 115. The broadband access headend 111 may include a cable headend, a satellite headend, or a DSL headend, in accordance with various embodiments of the invention. The third location 112 may also include a PC, a media peripheral system, and/or a media peripheral as part of the media exchange network 100. The third location may be a home, for example.

The media exchange network may also include a media storage server 116 and a third ($3^{rd}$) party media server 117, both interfacing to the Internet infrastructure 115. The media storage server 116 may interact with the media exchange server 113 and may provide temporary and/or archival storage for digital media on the media exchange network 100. For example, the media storage server 116 may temporarily store media files that are addressed to certain media peripheral systems and/or PC's on the media exchange network 100. The third ($3^{rd}$) party media server 117 may store movies, video, user profiles, and other digital media that may be provided to users of the media exchange network 100.

In accordance with an alternative embodiment of the invention, a broadband access headend may be upgraded to a media exchange headend by adding functionality to facilitate the exchange of media on the media exchange network in conjunction with the media exchange server. Such functionality may include distributed networking capability and archival or long term media storage functionality, storage management and digital rights management. Temporary storage may be utilized to aid in the distribution and routing of media storage management, and digital rights management.

The media exchange server architecture may solve the problem of communication between a device such as a first media peripheral system, a first PC and a first media peripheral at a first home and second device such as a second media peripheral system, a second PC and a second media peripheral at another home over the media exchange network 100. The media exchange servers 113 and 114 may provide functionality on the media exchange network 100 including device registration, channel/program setup and management, and/or security.

The various elements of the media exchange network 100 may include storage locations for digital media and data. The storage locations may include, for example, hard disk drives, a DVD player, a CD player, floppy disk drives, RAM, or any combination of these. The storage locations may also include, for example, CompactFlash™, SmartMedia™, Memory Stick™, Secure Digital™, MultiMedia, PCMCIA, or any combination thereof.

The PC's 101, 105 may include desktop PC's, PC tablets, notebook PC's, handhelds, PDA's, or any computing device. The MPS's 102, 106 may be regarded as essentially enhanced set-top-boxes. The MPS's 102, 106 may each include a TV screen or monitor for viewing and interacting with various user interfaces, media, data, and services that may be available on the media exchange network. A remote control or pointing device may be utilized for control and/or navigation during viewing and/or interaction. The PC's 101 and 105 may each include a monitor for viewing and/or interacting with various user interfaces, media, data, and services that maybe available on the media exchange network using, for example, a keyboard and/or mouse. The MPS's, PC's, and/or MP's may include functional software that may support interaction with the media exchange servers and media peripherals on the media exchange network 100, in accordance with various embodiments of the invention.

The media peripherals 103, 107 of the media exchange network 100 may include, for example, a digital camera, a digital camcorder, an MP3 player, a home jukebox system, a personal digital assistant (PDA), a multi-media gateway device, and various home appliances. The media peripherals 103, 107 of the media exchange network 100 may include legacy media peripherals which are those media peripherals that are in existence today and are not fully compatible with the media exchange technology in accordance with various aspects of the invention. The media peripherals 103, 107 may also include new non-legacy media peripherals which may not be on the market yet or which are on the market but in either case will be fully compatible with the technology. A legacy media peripheral may not have the software or interface to interact directly with a media processing system on a media exchange network.

A legacy media peripheral may utilize a PC or a set-top-box as a proxy to interact with a media exchange network. A new media peripheral may connect to a media exchange network, interact directly with a media processing system on the media exchange network, and may be capable of utilizing digital certificates, for example. An existing media peripheral may have been designed so that it may be upgradeable. In this regard an existing media peripheral which may not be fully compliant with the technology may be upgraded to be wholly compliant with the technology associated with the various aspects of the invention.

In an embodiment of the present invention, a digital certificate may be embedded in the firmware or hardware of a new non-legacy media peripheral. The digital certificate may include certain information such as a device ID, a public key for encryption, and possibly other information related to services, payment terms, billing, and media push/pull and access restrictions and limitations. The digital certificate may be installed in the media peripheral by the manufacturer or seller at the time of purchase. Alternatively, the digital certificate may be downloaded by the manufacturer to the media peripheral, over a media exchange network, via a PC or an media peripheral system when a user first connects the media peripheral to a PC or a media peripheral system.

As utilized herein, a legacy media peripheral does not include a digital certificate or any other type of identifying firmware, software, or electronic hardware for interacting with a media exchange network. A legacy media peripheral relies on a PC or an MPS on the media exchange network to act as a proxy for the media peripheral for the purposes of association, authentication, and routing on the media exchange network. As utilized herein, a non-legacy media peripheral is a media exchange network ready peripheral device and includes a digital certificate or any other type of identifying firmware, software, or electronic hardware that may be read by or transferred to a PC, an MPS, or a broadband access headend on a media exchange network. A non-legacy MP may be moved to different locations and still be recognized by the media exchange network when connected to the media exchange network at those different locations through a PC, a media peripheral system, or a broadband access headend. Other embodiments of the invention may include various combinations and/or multiple instantiations of the elements of FIG. 1, in accordance with various aspects of the invention.

Figure 2:
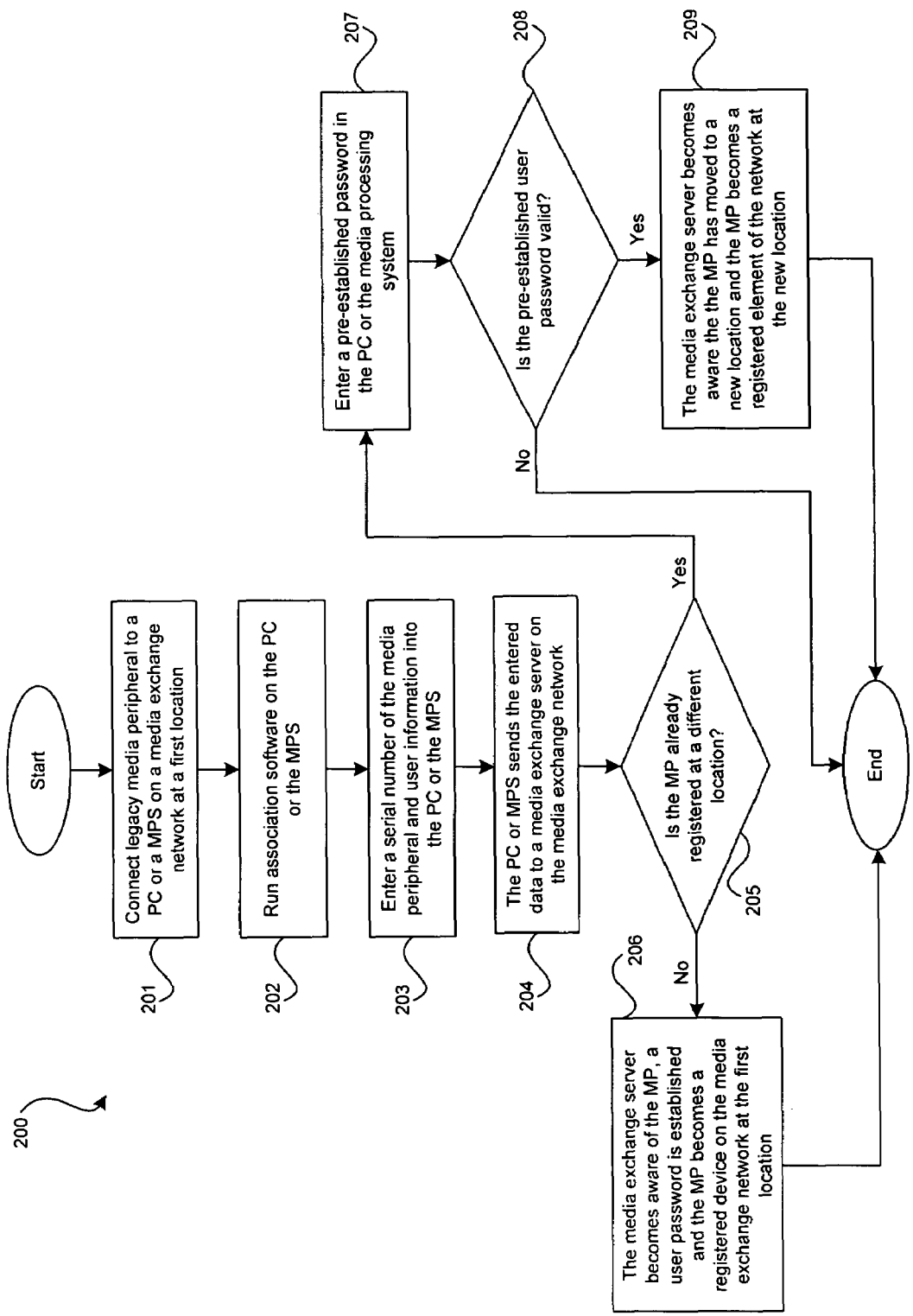
FIG. 2 is a flowchart illustrating an embodiment of a method to establish a secure association of, and authenticate, a legacy media peripheral on the media exchange network of FIG. 1, in accordance with various aspects of the present invention.

FIG. 2 is a flowchart illustrating an embodiment of a method 200 to establish a secure association of, and authenticate, a legacy media peripheral on the media exchange network of FIG. 1, in accordance with various aspects of the present invention. In step 201 a legacy media peripheral (MP) may be connected to a PC or a media peripheral system (MPS) on a media exchange network at a first location. In step 202, association software may be run on the PC or the media peripheral system. The association software may be part of a media exchange software (MES) platform that may be installed on the PC or the media peripheral system.

In step 203, a serial ID number of the legacy MP and user information may be entered into the PC or the media peripheral system. The user information may be, for example, a user name, a user home address, a user phone number or other similar information. In step 204, the PC or the media peripheral system may send the entered data to a media exchange server on the media exchange network. In step 205, if the media peripheral is not already registered at a different location than the first location then, in step 206, the media exchange server becomes aware of the media peripheral, a user password is established, and the media peripheral becomes a legitimate, registered device on the media exchange network at the first location.

In step 205, if the MP is already registered at a location other than the first location then, in step 207, a pre-established password may be entered into the PC or the media peripheral system. If the user password is valid, then the media exchange server becomes aware that the media peripheral has moved to a new location and the media peripheral may become an authenticated, registered element of the media exchange network at the new location. Otherwise, the media peripheral may be effectively locked out or prohibited from accessing the media exchange network.

In the method 200 of FIG. 2, the PC or the media peripheral system may act as a proxy for the media peripheral, allowing the media peripheral to be recognized via the PC or the media processing system. In this regard, the proxy media peripheral system may recognize and associate the media peripheral with the media exchange network. In one aspect of the invention, recognition and/or authentication may occur in the media exchange network using a pre-established user password. The pre-established user password may be established by a network administrator or by a device manufacturer, for example.

As an example, referring to FIG. 1, a user at the first location 104 may connect the media peripheral 103 to the PC 101 via a USB or Firewire (IEEE 1394) connection. The first location 104 may be a first home, for example. Notwithstanding, the user may then execute the association software installed on the PC 101 or the association software may be automatically executed by the PC 101. The PC 101 may cue or prompt the user to enter any combination of the serial number of the MP 103, the user's name, an address of the location of the MP 103, and a home telephone or directory number (DN). The PC 101 may send the entered data to the media exchange server 113 via the broadband access headend 109 and the Internet infrastructure 115. The media exchange server 109 may process the received data and determine that the MP 103 is already registered on the media exchange network 100 and is associated with the location of the second location 108. The media exchange server 113 may then request that a pre-established user password be entered. The user at the first location 104 may enter the correct user password which may be validated by the media exchange server 113. The media exchange server 113 may become aware that the previously registered media peripheral is at the new location of the first location 104 with a legitimate user. The legitimate user may be a user who knows the correct password associated with the previously registered MP 103. Accordingly, the media peripheral 103 may become an authorized, registered network entity or network element of the media exchange network at the new location of the first location 104. The user may now exchange media between the media peripheral 103 and other devices on the media exchange network 100.

In an embodiment of the invention, the media exchange server 113 may have the capability to identify the location of the PC 101 and, therefore, the MP 103 by its physical connection to the media exchange network 100. In another embodiment of the present invention, the media exchange server 113 may be capable of identifying the location of the PC 101 and, therefore, the media peripheral 103 by only one or a combination of its IP address, MAC address, primary DNS, secondary DNS, for example.

As an illustration, referring to FIG. 1, a user at second location 108 may connect the media peripheral 107 to the media peripheral system 106 via a wireless link. The user may then execute the association software installed on the media peripheral system 106. The media peripheral system 106 may cue or prompt the user to enter information such as the serial number of the MP 107 and the user's name, address of the location of the media peripheral 107, and home telephone number, for example. The media peripheral system 106 may then send the entered data to the media exchange server 114 via the broadband access headend 110 and the Internet infrastructure 115. The media exchange server 110 may process the received data and determine that the media peripheral 107 is already registered on the media exchange network 100 and is associated with the location of the first location 104. The media exchange server 114 may then request that a pre-established user password be entered. The user at the second location 108, having stolen the media peripheral 107 from the first location 104, would enter an incorrect user password that would be detected by the media exchange server 114. Accordingly, the media exchange server 114 may lock out or prohibit the MP 107 from accessing the media exchange network 100. In an another aspect of the invention, the media exchange server 114 may recognize that the MP 107 is stolen and may report the attempted association and authentication to the appropriate authorities. In one aspect of the invention, the stolen MP may be placed in a special list and may not be permitted to access the network without administrator intervention.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create an MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
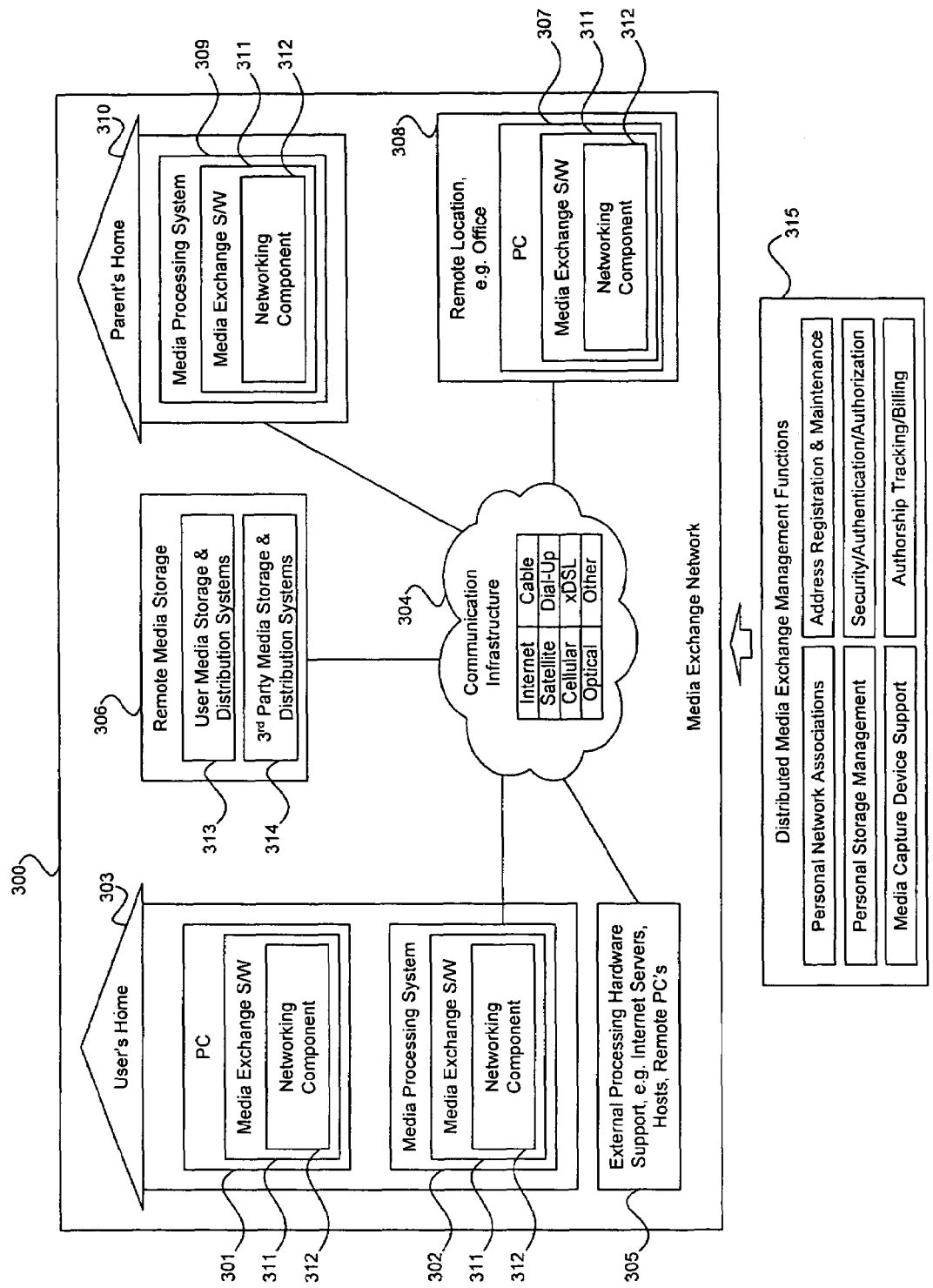
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
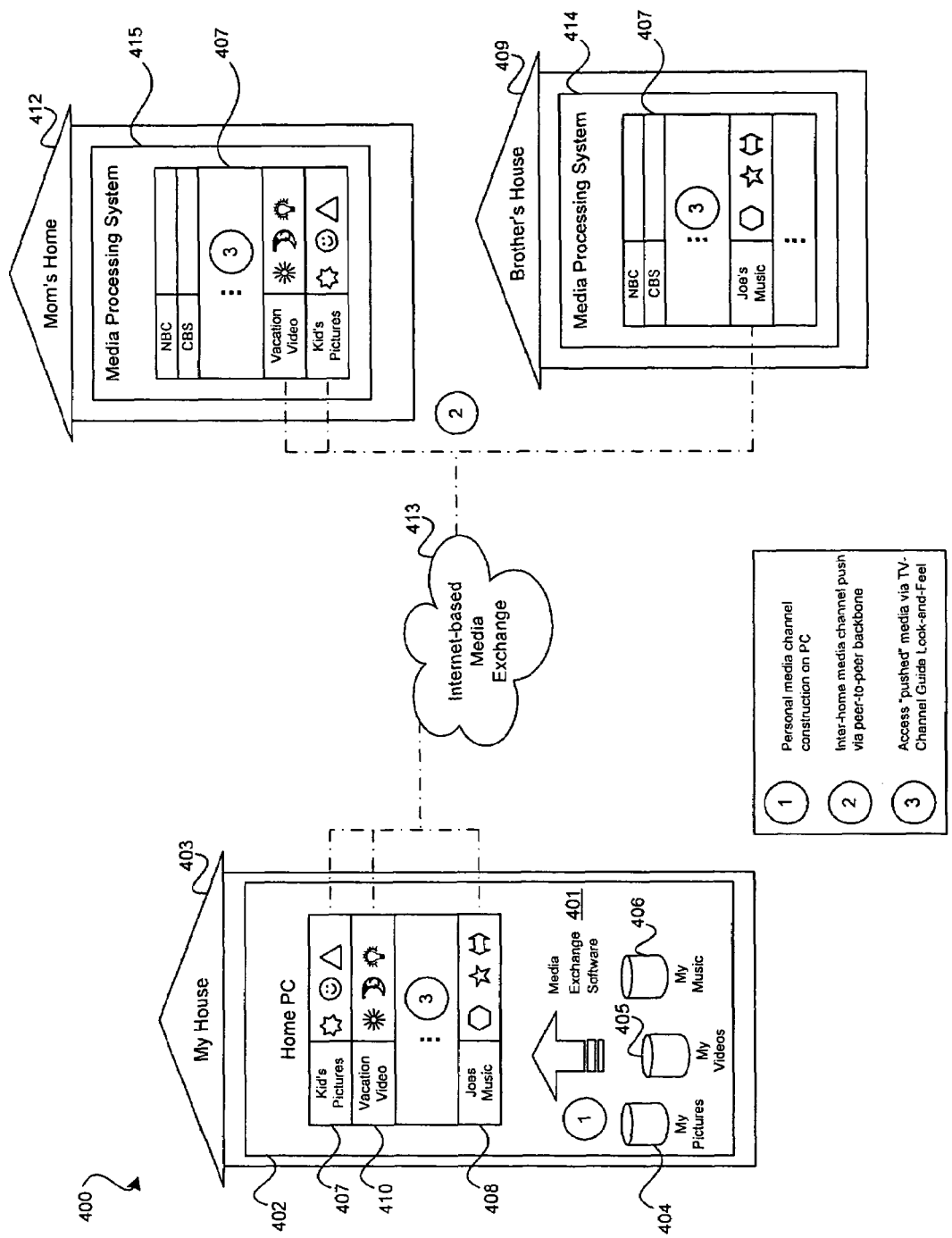
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
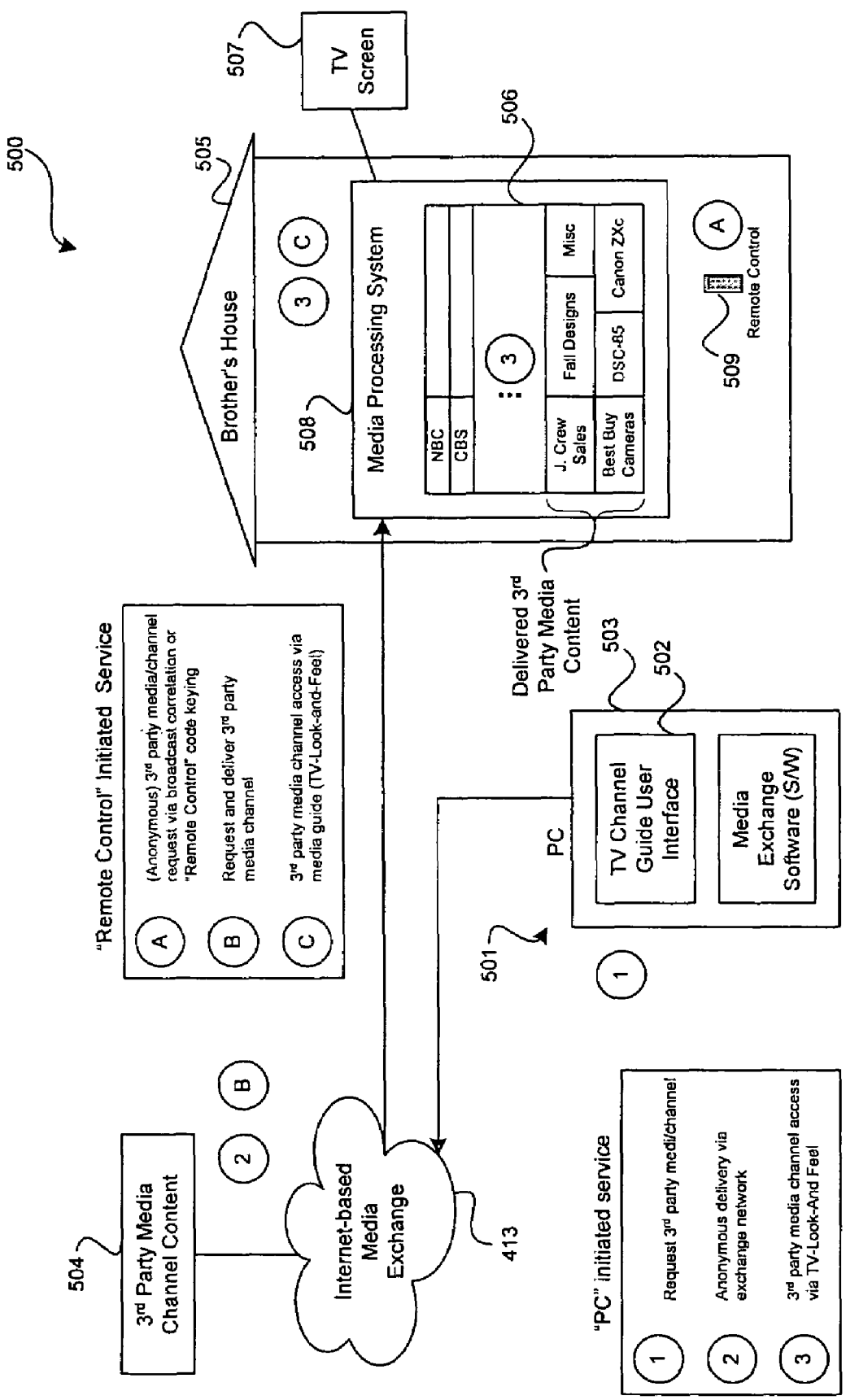
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
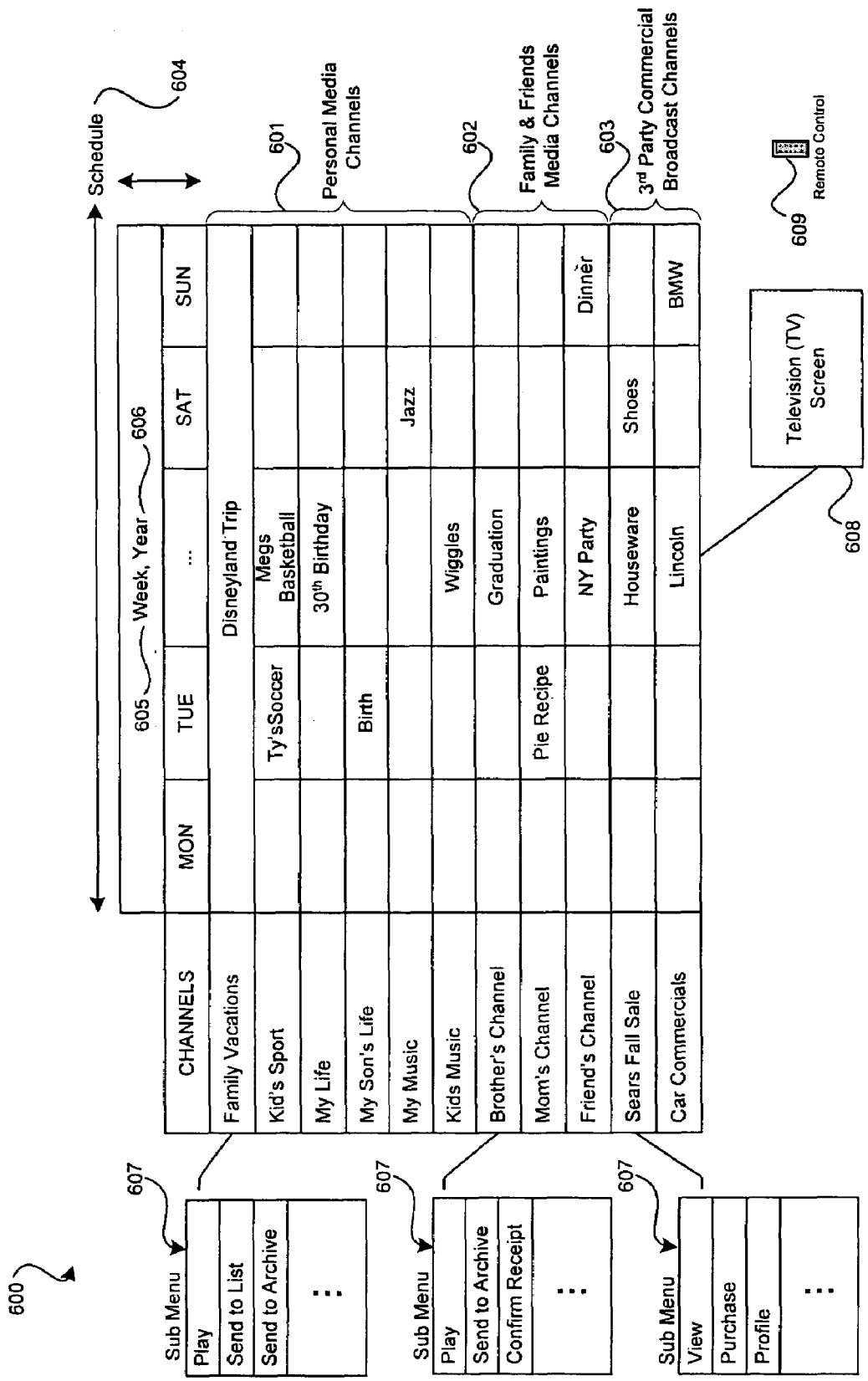
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
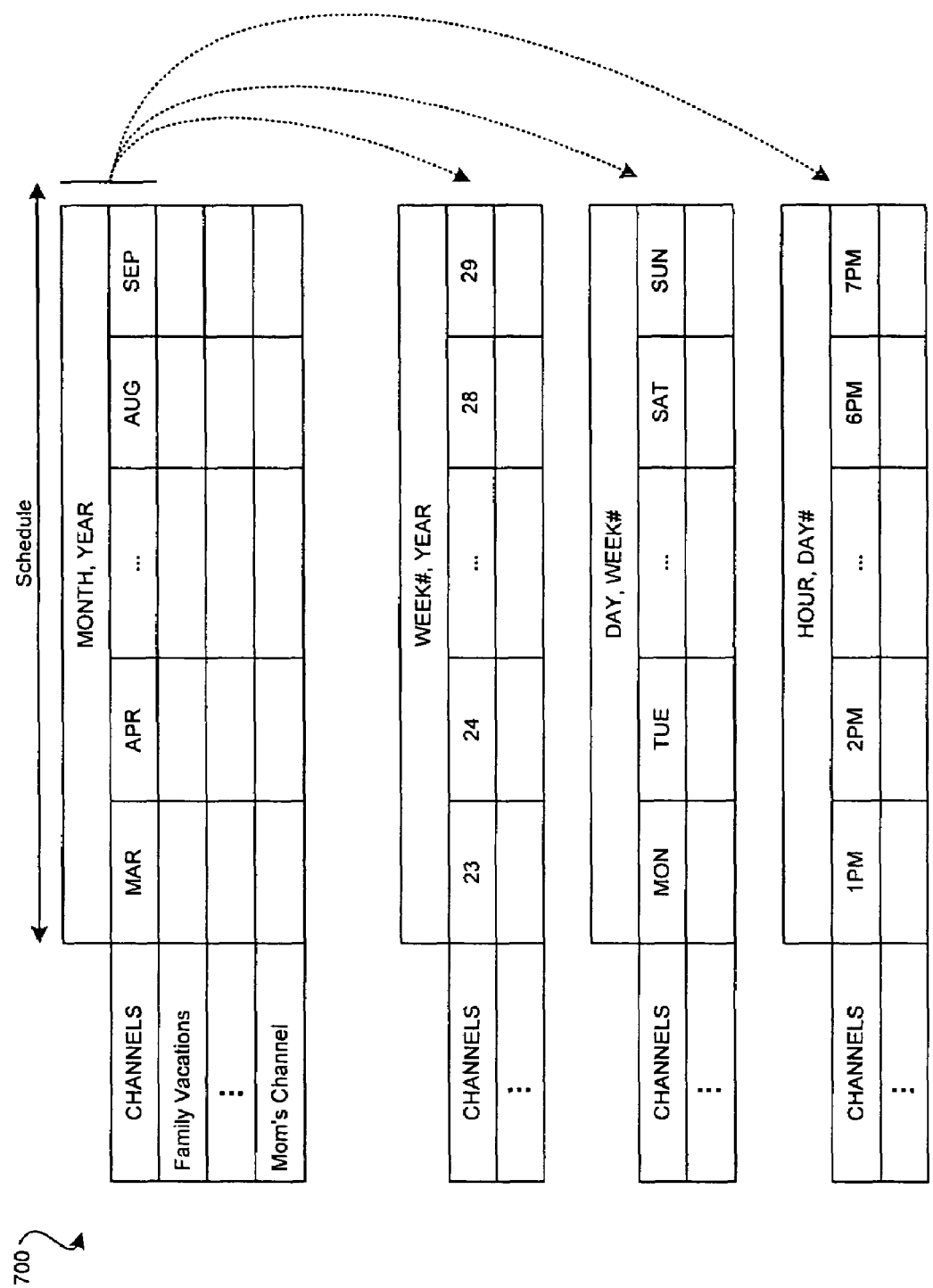
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
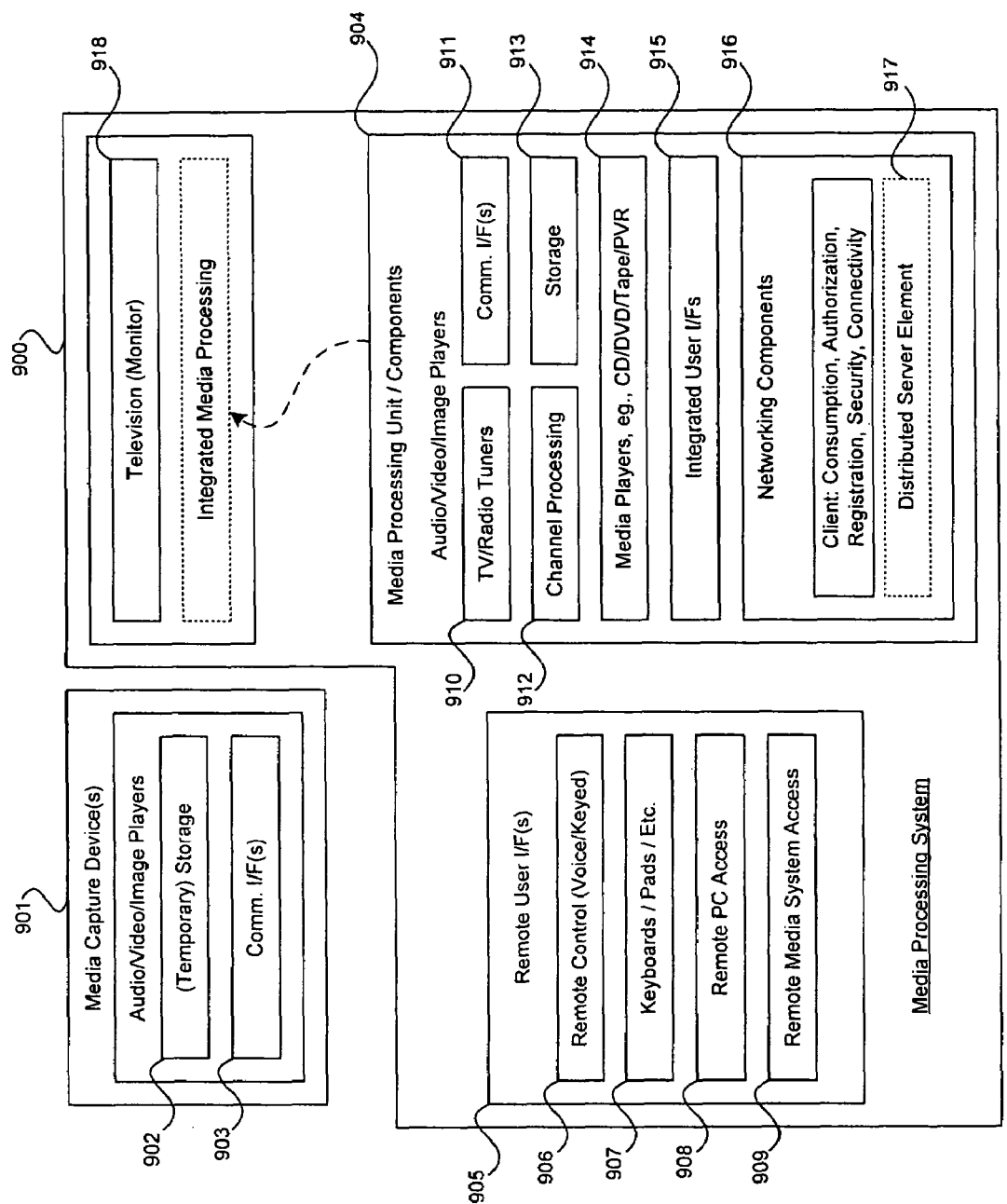
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
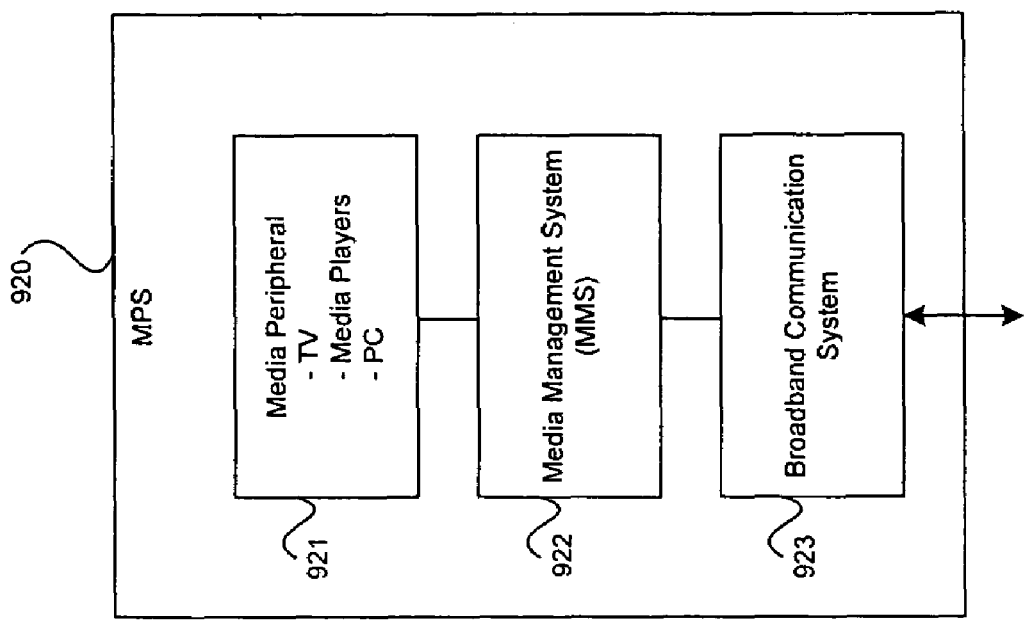
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
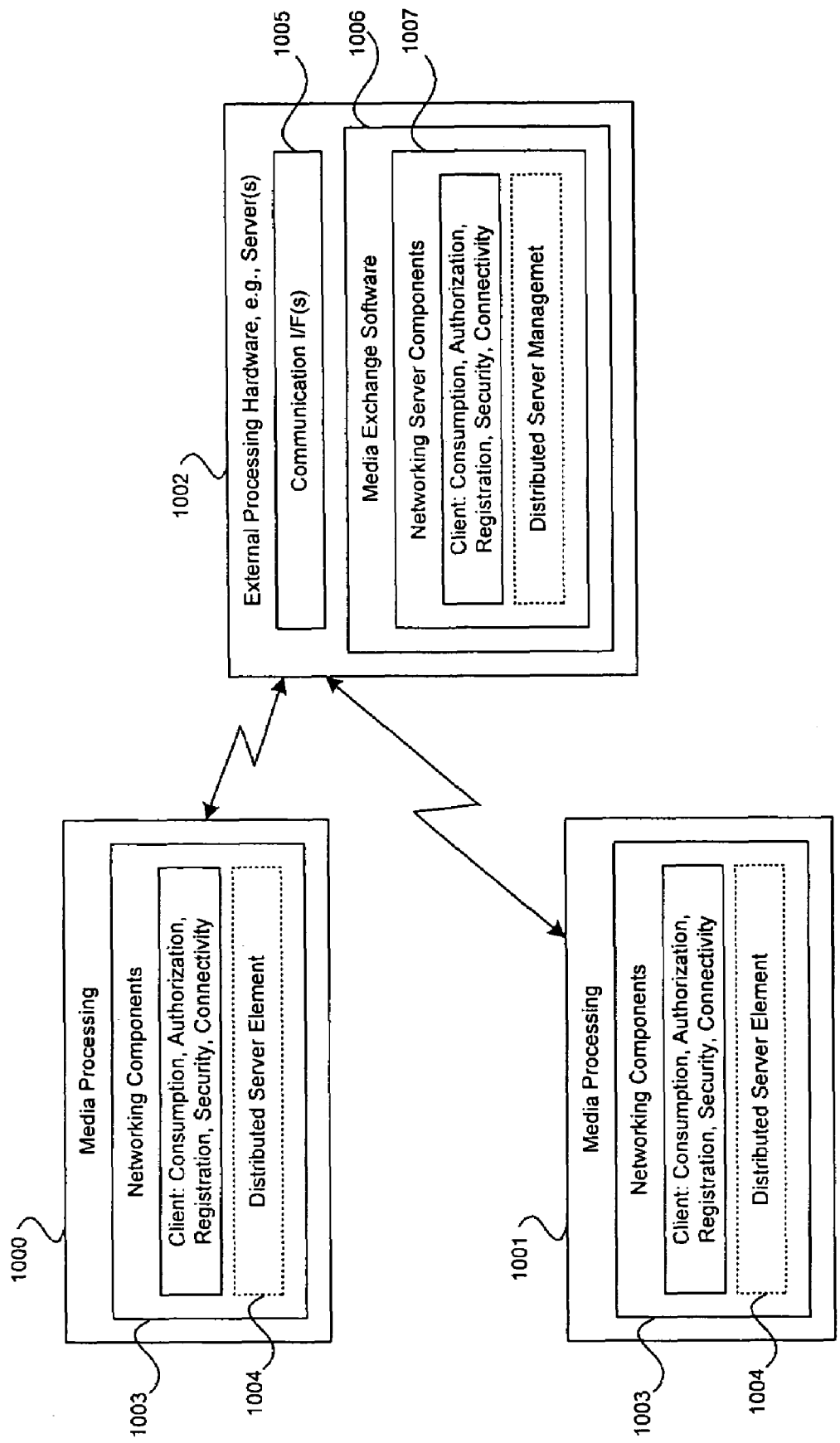
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
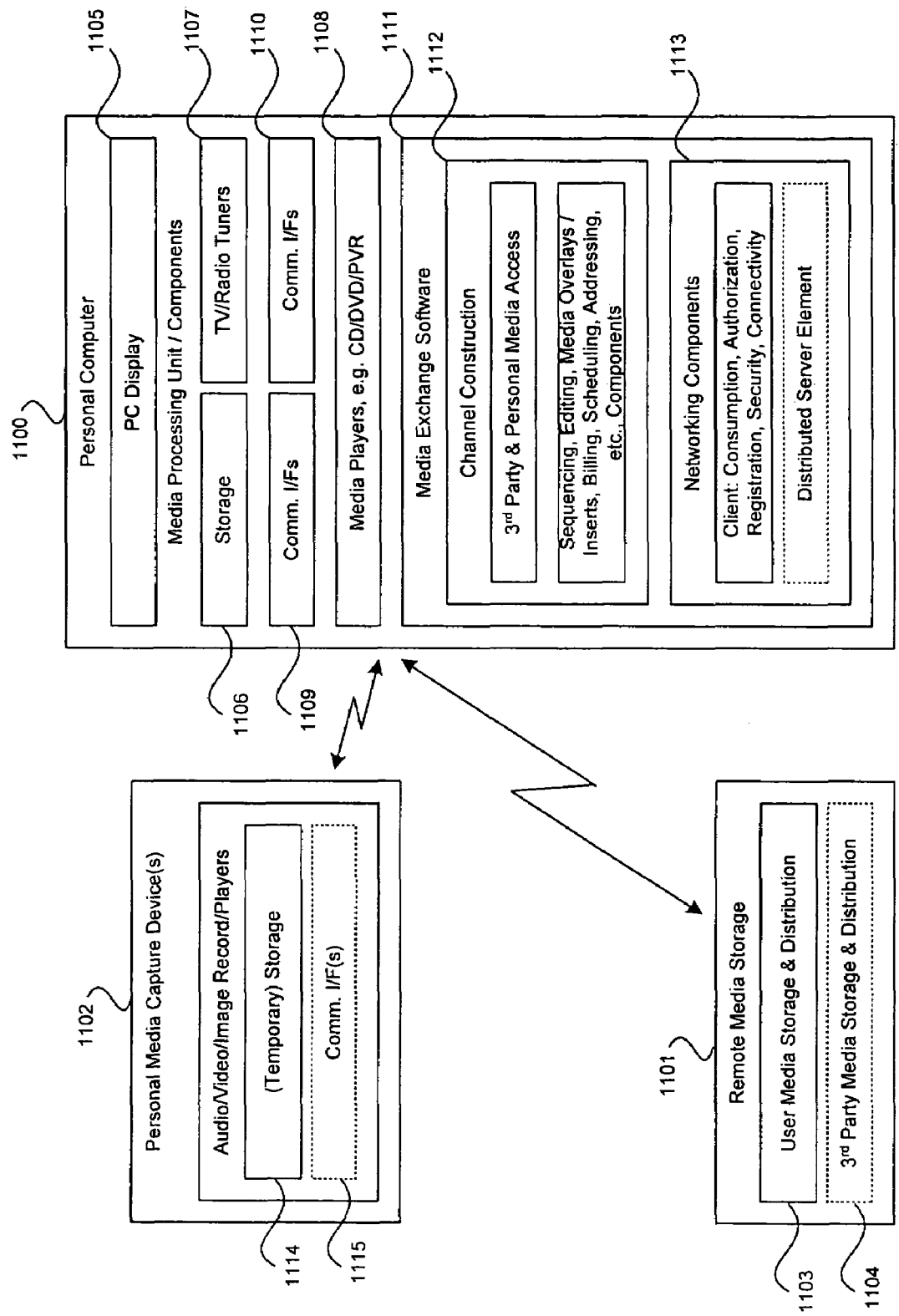
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In light of the foregoing, secure access and communication of information in a distributed media network may include at least one processor that may detect when a legacy media peripheral is connected to the PC and/or a media processing system coupled to the distributed media network. The processor may be a computer processor, a media peripheral processor, a media exchange system processor and/or a media processing system processor. Notwithstanding, the processor may establish and associate one or more identifiers with the legacy media peripheral, which may be utilized to facilitate communication between the legacy media peripheral and/or entities within the distributed media network. In one aspect of the invention, the processor may request a legacy media peripheral identifier and an identifier of a user that is currently using the legacy media peripheral. An exemplary media peripheral identifier may include a serial number of the legacy media peripheral. Similarly, an exemplary user identifier may be a user password and/or a user name. The processor may be adapted to execute media peripheral association software on the PC and/or the media processing system.

In accordance with the invention, the processor may be adapted to determine a first location of the legacy media peripheral and the user utilizing the legacy media peripheral. Based on this determination, the processor may create an association between the legacy media peripheral identifier and/or the user identifier, and the location of the legacy media peripheral. In instances where the legacy media peripheral was previously registered at a first location within the network, the processor may acquire the user identifier previously utilized to facilitate communication between the legacy media peripheral and entities on the distributed media network. In this regard, the acquired user identifier for the legacy media peripheral may be authenticated by the processor prior to facilitating communication of the legacy media peripheral over the distributed media network. Accordingly, the processor may register the legacy media peripheral for operation at a second location subsequent to validation of the acquired user identifier.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure access and communication of information in a distributed media network, the method comprising:
   detecting, at a first geographic location, when a legacy media peripheral is connected to one or both of a PC and a media processing system at said first geographic location within the distributed media network;
   associating at least one identifier with said legacy media peripheral, wherein said at least one identifier is used to validate said legacy media peripheral for use at said first geographic location;
   utilizing said at least one identifier to facilitate communication by and/or to said legacy media peripheral over the distributed media network;
   requesting said at least one legacy media peripheral identifier and at least one identifier of a user utilizing said legacy media peripheral; and
   wherein if said legacy media peripheral is previously registered at said first geographic location within said network, acquiring said at least one user identifier to facilitate communication by and/or to said legacy media peripheral over the distributed media network.

2. The method according to claim 1, wherein said at least one legacy media peripheral identifier is a serial number of said legacy media peripheral.

3. The method according to claim 1, wherein said at least one user identifier is one or both of a user password and/or a user name.

4. The method according to claim 1, comprising determining said first geographic location of said legacy media peripheral and said user utilizing said legacy media peripheral.

5. The method according to claim 4, comprising associating said legacy media peripheral identifier and said user identifier with said first geographic location of said legacy media peripheral.

6. The method according to claim 1, comprising validating said acquired at least one user identifier for said legacy media peripheral prior to said facilitation of communication by and/or to said legacy media peripheral over the distributed media network.

7. The method according to claim 6, comprising registering said legacy media peripheral for operation at a second geographic location subsequent to said validation of said acquired at least one user identifier.

8. The method according to claim 1, comprising executing a media peripheral association software on said one or both of said PC and/or said media processing system.

9. A machine-readable storage having stored thereon, a computer program having at least one code section for secure access and communication of information in a distributed media network, the at least one code section being executable by a machine for causing the machine to perform steps comprising:
   detecting, at a first geographic location, when a legacy media peripheral is connected to one or both of a PC and a media processing system at said first geographic location within the distributed media network;
   associating at least one identifier with said legacy media peripheral, wherein said at least one identifier is used to validate said legacy media peripheral for use at said first geographic location;
   utilizing said at least one identifier to facilitate communication by and/or to said legacy media peripheral over the distributed media network;
   wherein said at least one code section comprises code for requesting said at least one legacy media peripheral identifier and at least one identifier of a user utilizing said legacy media peripheral; and
   wherein said at least one code section comprises code for acquiring said at least one user identifier to facilitate communication by and/or to said legacy media peripheral over the distributed media network, if said legacy media peripheral is previously registered at said first geographic location within said network.

10. The machine-readable storage according to claim 9, wherein said at least one legacy media peripheral identifier is a serial number of said legacy media peripheral.

11. The machine-readable storage according to claim 9, wherein said at least one user identifier is one or both of a user password and/or a user name.

12. The machine-readable storage according to claim 9, wherein said at least one code section comprises code for determining said first geographic location of said legacy media peripheral and said user utilizing said legacy media peripheral.

13. The machine-readable storage according to claim 12, wherein said at least one code section comprises code for associating said legacy media peripheral identifier and said user identifier with said first geographic location of said legacy media peripheral.

14. The machine-readable storage according to claim 9, wherein said at least one code section comprises code for validating said acquired at least one user identifier for said legacy media peripheral prior to said facilitation of communication by and/or to said legacy media peripheral over the distributed media network.

15. The machine-readable storage according to claim 14, wherein said at least one code section comprises code for registering said legacy media peripheral for operation at a second geographic location subsequent to said validation of said acquired at least one user identifier.

16. The machine-readable storage according to claim 9, wherein said at least one code section comprises code for executing a media peripheral association software on said at least one of said PC and said media processing system.

17. A system for secure access and communication of information in a distributed media network, the system comprising:
- at least one processor operable to detect that detects, at a first geographic location, when a legacy media peripheral is connected to one or both of a PC and a media processing system at said first geographic location within the distributed media network;
- said at least one processor is operable to associate associates at least one identifier with said legacy media peripheral, wherein said at least one identifier is used to validate said legacy media peripheral for use at said first geographic location;
- said at least one processor is operable to utilize utilizes said at least one identifier to facilitate communication by and/or to said legacy media peripheral over the distributed media network;
- wherein said at least one processor is operable to request said at least one legacy media peripheral identifier and at least one identifier of a user utilizing said legacy media peripheral; and
- wherein said at least one processor is operable to acquire said at least one user identifier to facilitate communication by and/or to said legacy media peripheral over the distributed media network, if said legacy media peripheral is previously registered at said first geographic location within said network.

18. The system according to claim 17, wherein said at least one legacy media peripheral identifier is a serial number of said legacy media peripheral.

19. The system according to claim 17, wherein said at least one user identifier is one or both of a user password and/or a user name.

20. The system according to claim 17, wherein said at least one processor is operable to determine said first geographic location of said legacy media peripheral and said user utilizing said legacy media peripheral.

21. The system according to claim 20, wherein said at least one processor is operable to associate said legacy media peripheral identifier and said user identifier with said first geographic location of said legacy media peripheral.

22. The system according to claim 17, wherein said at least one processor is operable to validate said acquired at least one user identifier for said legacy media peripheral prior to said facilitation of communication by and/or to said legacy media peripheral over the distributed media network.

23. The system according to claim 22, wherein said at least one processor is operable to register said legacy media peripheral for operation at a second geographic location subsequent to said validation of said acquired at least one user identifier.

24. The system according to claim 17, wherein said at least one processor is operable to execute a media peripheral association software on said one or both of said PC and/or said media processing system.

25. The system according to claim 17, wherein said at least one processor is one or more of a computer processor, a media peripheral processor, a media exchange system processor and/or a media processing system processor.

* * * * *

UNITED STATES PATENT AND TRADEMARK OFFICE
CERTIFICATE OF CORRECTION

| | |
|---|---|
| PATENT NO. | : 7,593,530 B2 |
| APPLICATION NO. | : 10/675386 |
| DATED | : September 22, 2009 |
| INVENTOR(S) | : Karaoguz et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Twenty-first Day of September, 2010

David J. Kappos
*Director of the United States Patent and Trademark Office*